Nov. 4, 1952 W. A. HUMPHREY 2,616,357
ELECTRIC TOASTER
Filed Jan. 2, 1948 5 Sheets-Sheet 2

INVENTOR.
Warren A. Humphrey
BY Harry S. DeMarsh
ATTORNEY.

Nov. 4, 1952　　　W. A. HUMPHREY　　　2,616,357
ELECTRIC TOASTER

Filed Jan. 2, 1948　　　　　　　　　　　　5 Sheets-Sheet 3

INVENTOR.
Warren A. Humphrey
BY
ATTORNEY.

Nov. 4, 1952

W. A. HUMPHREY 2,616,357

ELECTRIC TOASTER

Filed Jan. 2, 1948

INVENTOR.
Warren A. Humphrey
BY Harry S. Ducarre
ATTORNEY.

Nov. 4, 1952 W. A. HUMPHREY 2,616,357
ELECTRIC TOASTER
Filed Jan. 2, 1948 5 Sheets-Sheet 5
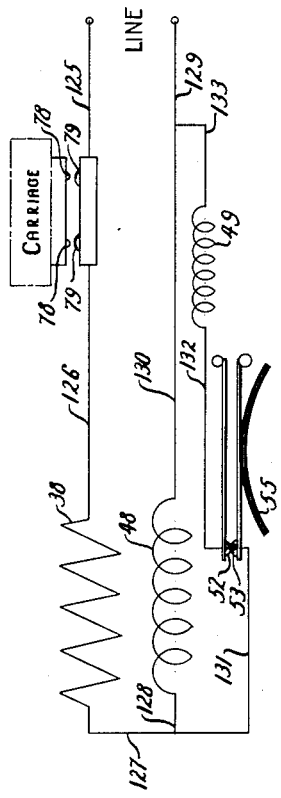
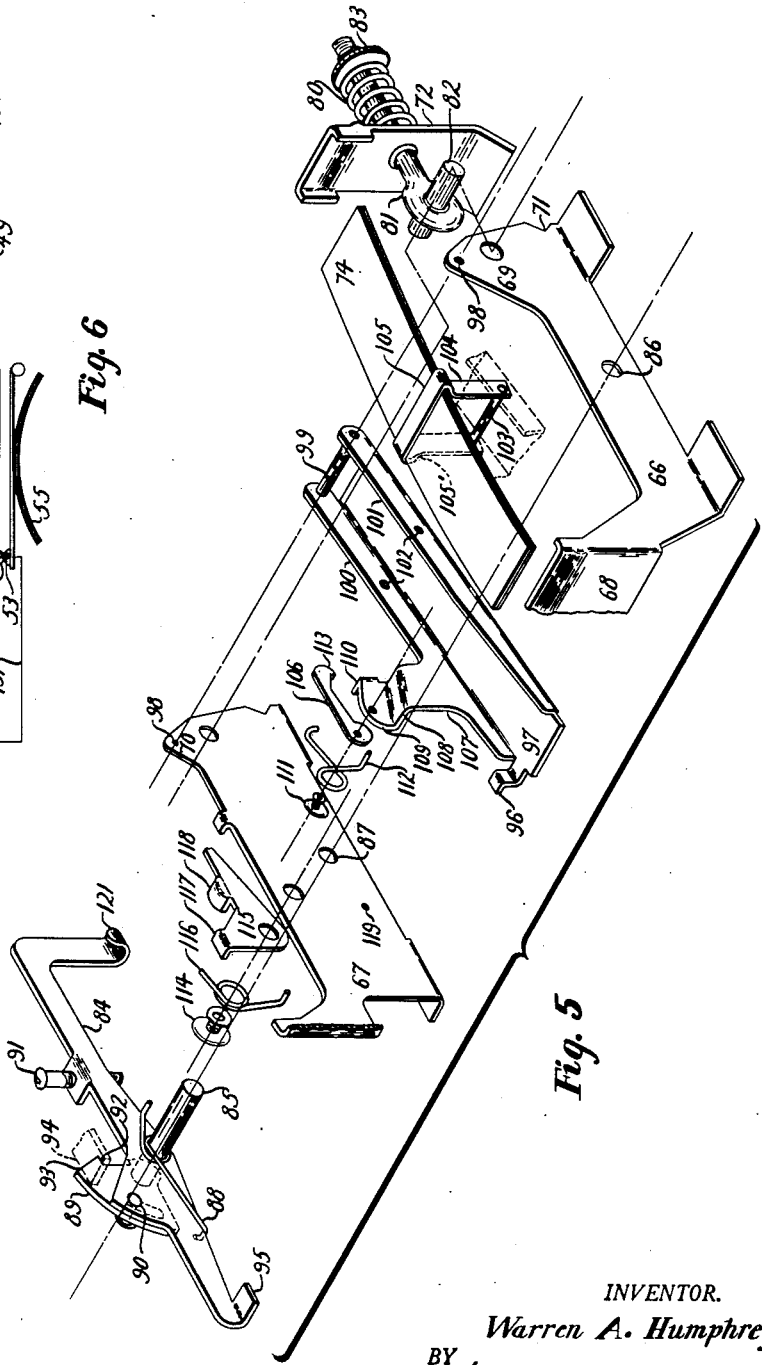
INVENTOR.
Warren A. Humphrey
BY Harry S. Dumarse
ATTORNEY.

Patented Nov. 4, 1952

2,616,357

UNITED STATES PATENT OFFICE 2,616,357

ELECTRIC TOASTER

Warren A. Humphrey, Canton, Ohio, assignor to The Hoover Company, North Canton, Ohio, a corporation of Ohio Application January 2, 1948, Serial No. 206

2 Claims. (Cl. 99—329)

This invention relates to toasters and more particularly to a thermal timer for timing the duration of successive toasting intervals whereby toast may be prepared of the same degree of brownness for each succeeding toasting operation regardless of the number of successive toasting operations or of the manual setting for preparing light, medium, or dark toast.

Thermal timers for toasters which operate on the heat-up principle of operation are known in the art. Such timers time the toasting interval by the time it takes for a thermally responsive element to be heated to a predetermined high temperature. That is, the toasting interval is initiated simultaneously with the energization of the heater for the thermally responsive element and is terminated when the thermally responsive element is heated to a predetermined higher temperature.

Such timers have the inherent disadvantage that they tend to over-compensate. That is, as the toaster is operated repeatedly in rapid succession, the toaster as a whole heats up and acquires residual heat. This residual heat aids in the toasting operation so that the toasting interval should be sequentially shortened after the first toasting operation. However, the thermal timer itself also heats up and at a faster rate than the toaster as a whole. If the same quantity of heat is supplied to the thermal timer for each succeeding toasting operation the timer acts faster and faster in advance of the toasting rate even though the toaster as a whole is also acquiring residual heat. As a result the toast is underdone after the first toasting operation unless some means is provided for preventing it.

According to the present invention the thermal timer is initially heated by two heaters to heat the thermal timer for properly timing the first toasting operation. As the toaster heats up with rapid repeated use, one of the heaters is deenergized at the proper time during the timing of a toasting interval depending upon the temperature of the toaster so that toasting intervals after the first are prolonged sufficiently to compensate for the tendency of the thermal timer to over-compensate. The time of the deenergization of the second heater depends entirely upon the temperature of the toaster as a whole. It may be deenergized during the first toasting operation starting with a cold toaster but in such a case for succeeding toasting operations it will be deenergized much earlier in the toasting cycle.

Thermal timers of the heat-up type also have the disadvantage that it is necessary for the operator to wait until the thermal timer has cooled before a succeeding toasting operation can be begun. The length of the period of waiting may be shortened by providing some means for quickly cooling the thermally responsive element but it is still necessary for the operator to wait until the thermally responsive element has cooled to a proper low temperature.

According to another feature of this invention the operator may begin a new toasting operation immediately after a preceding one without waiting for the thermally responsive timer to cool. The toast carriers will be latched in toasting position regardless of the thermal condition of the thermal timer. The toasting operation will then proceed automatically without any further attention from the operator even though the thermal timer has not yet cooled. In fact the operator need not be aware of that fact but may begin a second toasting operation immediately after the first.

According to another object of this invention manually adjustable means is provided for varying the heat applied to the thermal timer during a toasting interval in adjusting the timer for preparing light, medium, or dark toast upon which is interposed thermally responsive means responsive to toaster temperature for also varying the heat applied to the thermal timer to compensate the thermal timer so that it will produce the same color of toast regardless of the residual heat in the toaster from previous toasting operations.

Other objects and advantages of this invention will become apparent as the description proceeds when taken in connection with the accompanying drawings in which:

Figure 5 is an exploded view showing the details of the latch release mechanism of this invention; and Figure 6 is a wiring diagram showing how the main heaters and auxiliary heaters are electrically connected.

Figure 1:
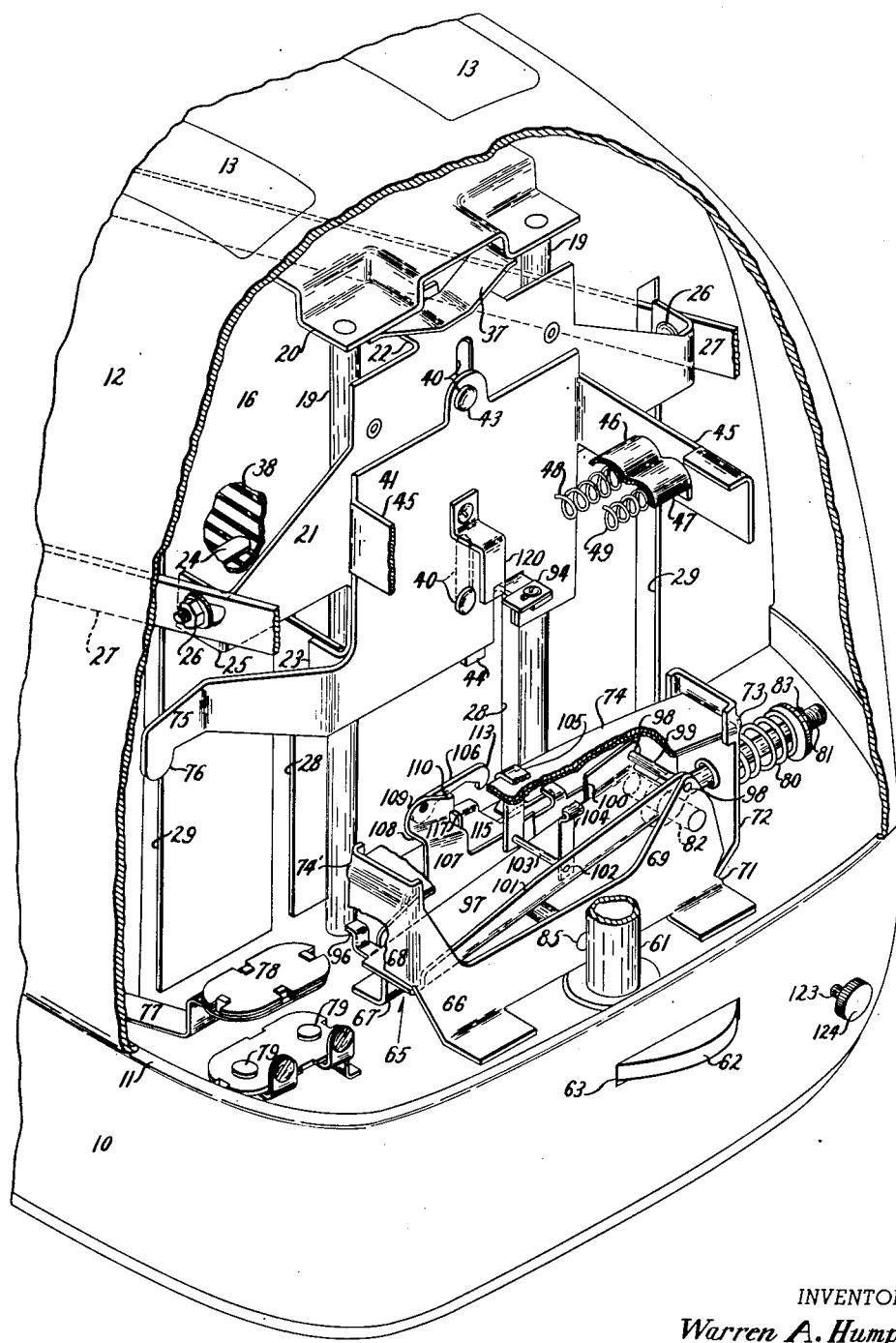
Figure 1 is a perspective of the toaster and timer of this invention with the parts broken away to better show the details.

Referring to the drawings the reference numeral 10 represents the base of the toaster made of an insulating moldable material, such as hard rubber, a phenolic condensation product, or other similar moldable insulating material. Mounted on the peripheral edge 11 of the base 10 is the lower edge of an appearance housing 12 having bread receiving slots 13 in its top. Mounted on a peripheral ledge 14 inwardly of the edge 11 of base 10 is a base plate 15. The base plate 15 supports, and the appearance housing 12 houses, the entire mechanism of the toaster and timer of this invention.

A partition 16 divides the interior of the toaster into a mechanism compartment 17 and a toasting oven 18. Secured at their bottom ends to the base plate 15 are a pair of vertically extending rods 19 which are secured at their upper ends to the partition 16 by a bracket 20. The rods 19 form guides for the vertical reciprocation of a carriage plate 21 in a manner well known in the art.

Bent rearwardly from the carriage plate 21 are a pair of lugs 23 to which are attached bread carriers 24. Also bent rearwardly from the carriage plate 21 are a second pair of lugs 25 to which are attached a pair of arms 27 by bolt and slot connections 26. The partition 16 is provided with two pairs of vertically extending slots 28 and 29 to provide for the vertical reciprocation of the carriers 24 and the arms 27.

At their rearward ends the arms 27 are pivoted at 30 to rearward extensions 31 of the side walls of the toasting chamber 18 and at their forward ends are extended forwardly, at 32, through a vertically extending slot 33 in the front of the appearance housing 12. A manipulating handle 34 is attached to the forward extensions 32 of the arms 27 outside of the appearance housing 12.

Figure 2:
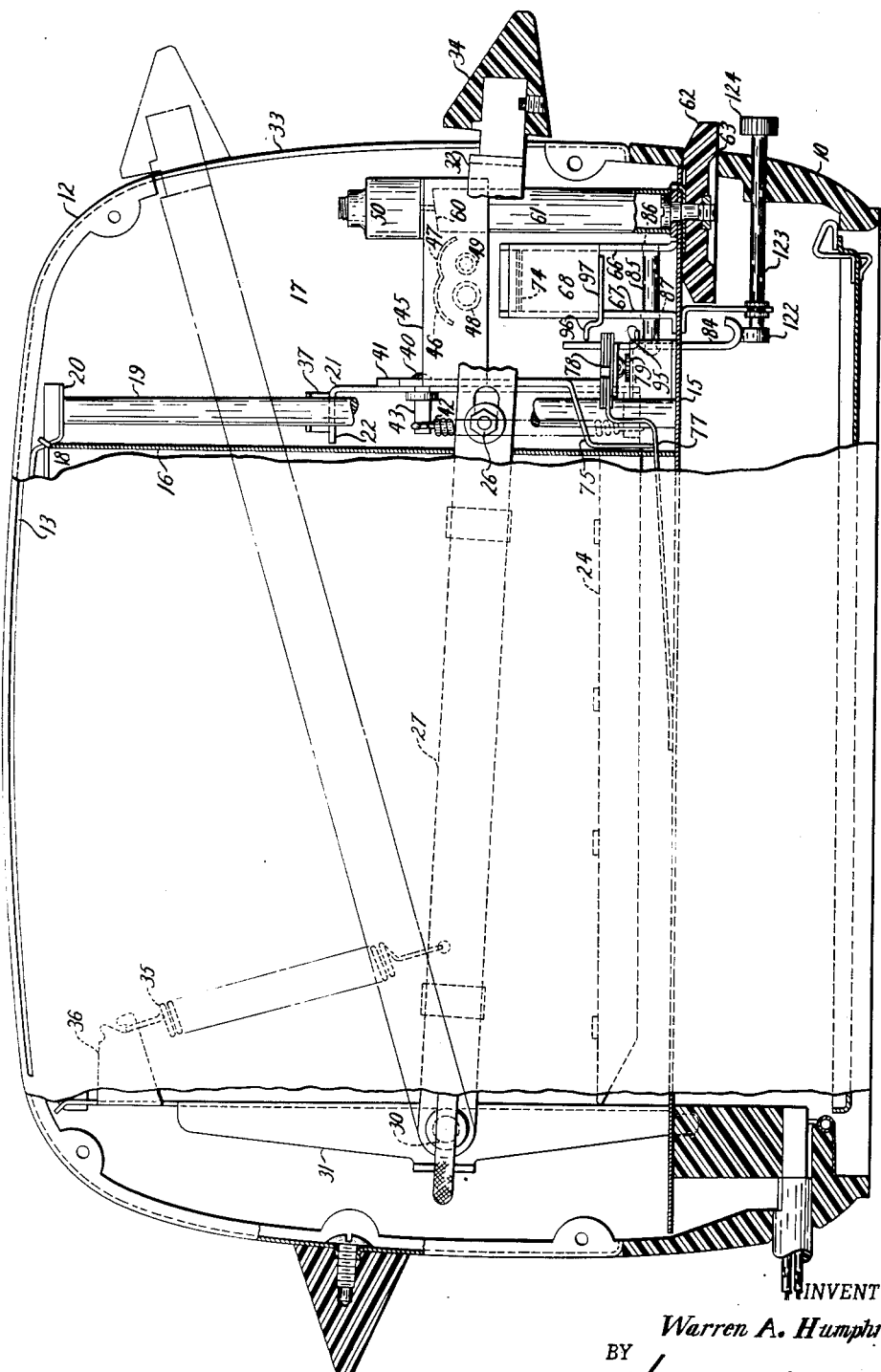
Figure 2 is a longitudinal cross-sectional view of the toaster and timer of Fig. 1.

The forward ends of the arms 27 and the associated parts including the carriage plate 21 and bread carriers 24 are spring-biased upwardly to bread receiving position in any suitable manner such as by springs 35 anchored at their upper ends to a lug 36 and at their lower ends to the arms 27 as shown in dotted lines in Fig. 2. A bumper spring 37 is secured to a lug 22 to dampen the upward movement of the carriage plate 21 as it moves upwardly under the bias of springs 35. Main heating elements 38 are positioned on opposite sides of the bread carriers 24 to perform the toasting function.

Slidably mounted on the carriage plate 21 by pin and slot connections 40 is an auxiliary plate 41 which is normally held in its downward position, against a suitable stop 44 struck forwardly from the carriage plate 21, by a spring 42 (Fig. 2) anchored at its upper end to the pin 43 secured to the auxiliary plate 41 and at its lower end to the carriage plate 21 in any suitable manner such as by a lug struck rearwardly from the carriage plate 21.

Extending forwardly from the auxiliary plate 41 are a pair of arms 45 carrying a pair of reflectors 46 and 47. Also carried by the arms 45 immediately below the reflectors 46 and 47 is a high heating capacity electrical heater 48 and a low heating capacity electrical heater 49.

Figure 3:
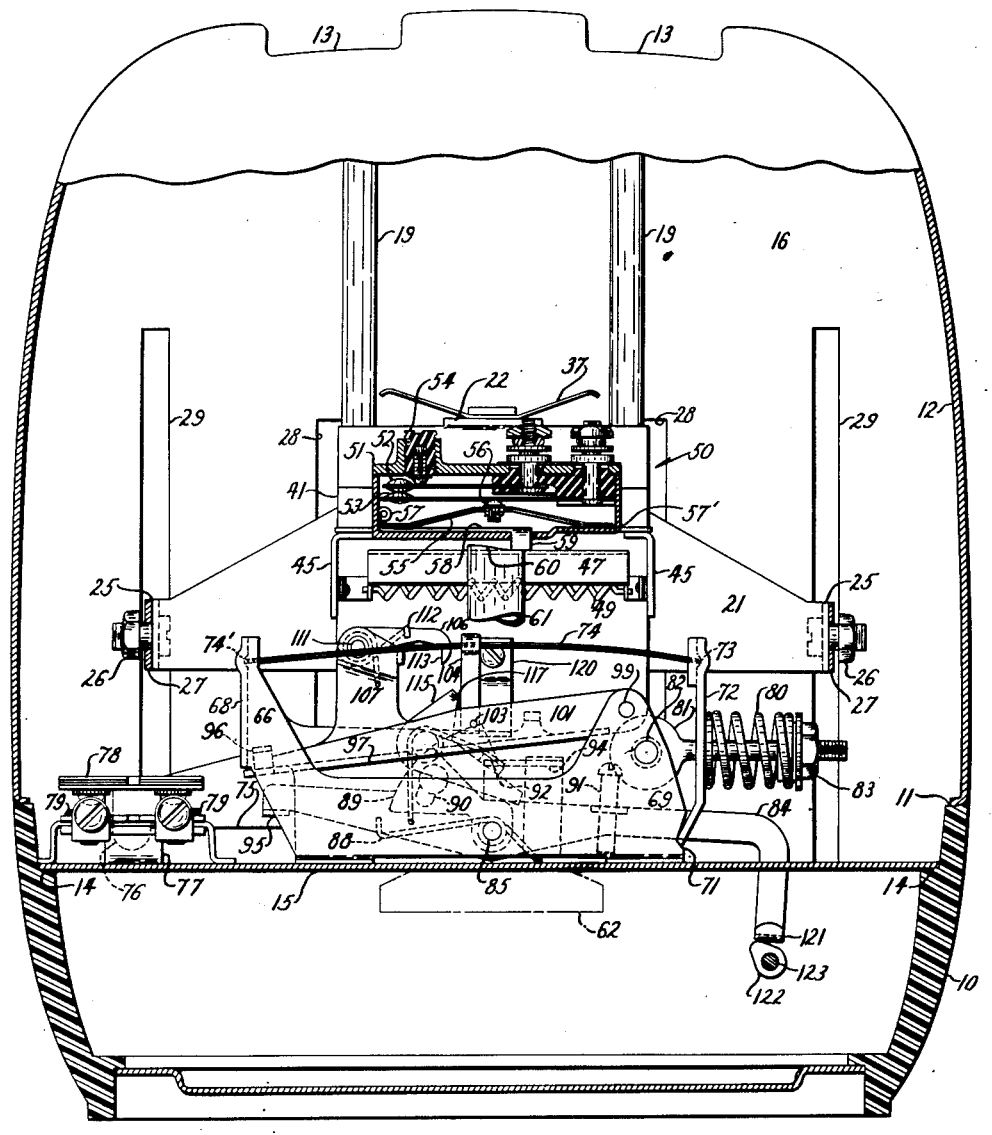
Figure 3 is a front plan view of the timer of this invention with the walls of the toaster broken away to show the details of the timer with the thermal timer in cold position and the toast carriers in toasting position.

Carried by the arms 45, in front of the reflectors 46 and 47 and heaters 48 and 49 is a switch mechanism generally indicated by the reference numeral 50 (Fig. 3). The switch 50 comprises a body 51 carrying a pair of spring mounted contacts 52 and 53. The position of spring contact 52 is adapted to be adjusted by a screw 54 which constitutes a factory adjustment. The spring contact 53 is adapted to be actuated by bimetallic element 55. As shown in Fig. 3 the bimetallic element 55 is attached at its left hand end to a spring 58 and at its opposite end is anchored to the base 57'. The central portion of the bimetallic element 55 is bowed upwardly and has a button 56 thereon to contact the spring arm of the spring contact 53.

The spring 58 is attached to the switch housing 51 at 57 and has a projection 59 extending through the bottom plate 57' of the housing 51. Upward movement of the projection 59 will apply a spring pressure to the contact button 56 and thus to the spring arm of the spring contact 53 so as to vary the temperature at which the contacts 52 and 53 make and break electrical contact as will presently appear.

Extending outwardly and rearwardly from one side of the auxiliary plate 41 is an arm 75 having a protuberance 76 adapted to contact a spring arm 77 mounted on the base plate 15 and carrying a bridging contact 78 adapted to bridge fixed contacts 79 insulatedly mounted on the base plate 15.

The projection 59 is adapted to be contacted, in a manner which will presently appear, by a cam 60 on the upper end of a vertically extending shaft 61 rotatably mounted on the base plate 15 and having a manipulating knob 62 directly connected to the shaft 61 with its edge extending through an opening 63 in the front of the base 10 for ease in manipulation.

Rigidly secured to the base plate 15 immediately below the reflectors 46 and 47 and the electric heaters 48 and 49 is a bracket generally indicated by the reference numeral 65. The bracket 65 includes side members 66 and 67, end member 68 and a pair of upwardly extending projections 69 and 70 at its opposite end.

The side members 66 and 67 of bracket 65, have depressions 71 for pivotally supporting the lower end of a plate 72 having a depression 73 therein for receiving one end of a bimetallic snap-acting thermally responsive timer 74, the opposite end of which is received in a depression 74' in the end 68 of bracket 65.

Spring pressure is applied to the ends of the bimetallic element 74 by a compression spring 80 surrounding the threaded end of an eye bolt 81 extending through a central opening in the pivoted member 72 and pivotally attached to the side members 66 and 67 by a pin 82. A nut 83 applies pressure to the outer end of the spring 80 which, in turn, applies pressure to the pivoted arm 72 and thus to the ends of the thermally responsive timer 74.

Figure 4:
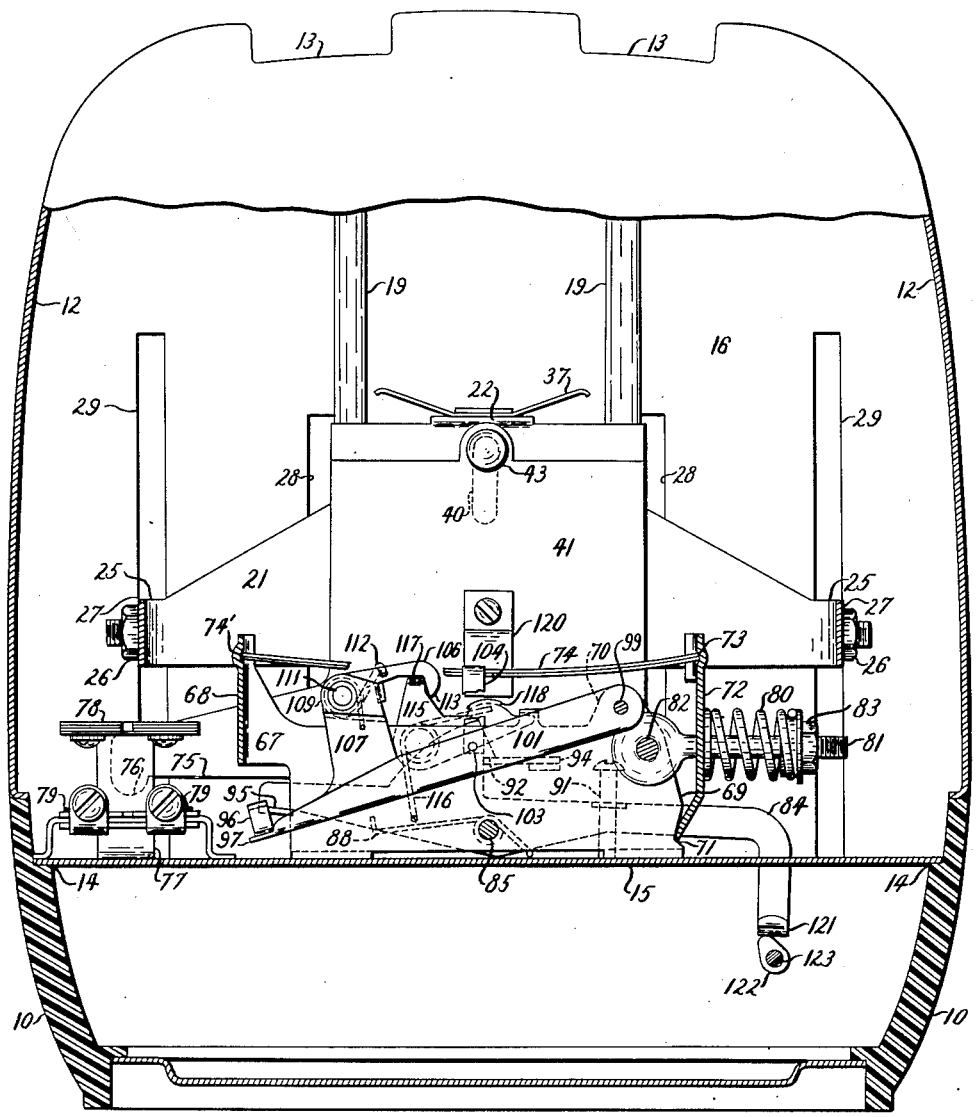
Figure 4 is a view similar to Fig. 3 showing the thermal timer in hot position and the toast carriers in toasting position.

A latch lever 84 lies rearwardly of the side member 67 and is pivoted to the side members 66 and 67 by a pin 85 extending through openings 86 and 87 in the side members 66 and 67 respectively. The lever 84 is spring-biased clockwise by a spring 88. Pivoted to the pin 85 is a latch hook 89 having limited pivoted movement relative to the latch lever 84 by means of a pin and slot connection 90 which constitutes a factory adjustment. Clockwise movement of the latch lever 84 is limited by an adjusting screw 91 which contacts the base plate 15 as shown in Fig. 4.

The latch hook 89 has a hook 92 and a cam 93 adapted to cooperate with a lug 94 struck forwardly from the carriage plate 21 as will presently appear. The latch lever 84 has a lug 95 which cooperates with a lug 96 on a latch release lever 97 as will be explained presently. Latch release lever 97 is pivoted at its right hand end between the sides 66 and 67 of the bracket 65 as at 98 by a pin 99 extending through openings in upwardly extending flanges 100 and 101 of the latch release lever 97. The flanges 100 and 101 have openings 102 for receiving a pin 103 extending through openings in the legs of an inverted U-shaped member 104 having its bight portion 105 overlying the central portion of the bimetallic timer 74. The legs of the member 104 are bent inwardly beneath the central portion of the bimetallic elements 74 as shown at 105' for a purpose to be hereinafter described.

Extending upwardly from the flange 100 of the latch release lever 97 is a lug 107 having a rearwardly extending ledge 108 and an upwardly extending portion 109 with a lug 110 extending rearwardly therefrom. Pivoted to the upward extension portion 109 by a rivet 111 and spring-biased against the lug 110 by the spring 112 is a link 106 having a hooked end 113 for a purpose to be hereinafter described.

Pivoted to the rear side of the inner wall 67 of the bracket 65 by a pin 114 is a link 115 spring-biased counterclockwise by a spring 116. The link 115 has tabs 118 and 117 bent rearwardly therefrom. The tab 118 forms one abutment for the spring 116 and the opening 119 in the wall 67 the other. Extending forwardly and downwardly from the auxiliary plate 41 is a tab 120 which cooperates with the tab 118 in a manner to be presently described.

The right hand end of latch lever 84 is extended downwardly through the base plate 15 and has a lug 121 thereon which cooperates with a cam 122 mounted on the end of the shaft 123 rotatably mounted so as to extend through the front of the base 10. A manipulating knob 124 is attached to the end of the shaft 123 outside of the base 10. This arrangement is for the purpose of manually releasing the toaster carriage independently of the timer as will later appear.

Referring to Fig. 6, one side 125 of the power line is connected to one of the fixed contacts 79. The other fixed contact 79 is connected to one side of the main heaters 38 by a conductor 126. The other side 129 of the power line is connected to the other side of the main heaters 38 by conductor 127, conductor 128, high heating capacity auxiliary heater 48 an dconductor 130 so that the main heaters 38 and the high heating capacity auxiliary heater 48 are connected in series. The low heating capacity auxiliary heater 49 is connected in parallel with the high heating capacity auxiliary heater 48 by conductor 131, contacts 53 and 52, conductor 132, heater 49 and conductor 133.

*Operation*

Fig. 1 shows the parts in the position they occupy when the timer and toaster are cold and the bread carriers are in receiving position.

Bread is inserted through the openings 13 so as to rest on carriers 24. The manipulating handle 34 is moved downwardly so as to move the carriers 24, the carriage plate 21 and the auxiliary plate 41 downward to toasting position against the bias of springs 35.

The auxiliary plate 41 is moved along with the carriage plate 21 by the spring 42 which holds the pin 43 at the lower end of the pin and slot connection 40 unless prevented as will hereinafter be explained. As the auxiliary plate 41 moves downwardly the lug 120 will engage the lug 118 of link 115 and pivot it clockwise against the bias of the spring 116.

In the movement of the carriage plate 21 downwardly the lug 94 extending forwardly from the carriage plate 21 will engage the cam 93 and move the latch lever 84 counter-clockwise until the lug 94 moves below the hook 92 at which time the spring 88 will return the latch lever 84 to its original position so as to position the hook 92 above the lug 94 and latch the carriers 24, carriage plate 21 and auxiliary plate 41 in toasting position.

Movement of the auxiliary plate 41 to downward position will position the reflectors 46 and 47 and the auxiliary heaters 48 and 49 immediately above the bimetallic timer 74. Movement of the auxiliary plate 41 downwardly will also cause the lug 76 to engage the spring arm 77 and bring the bridging contact 78 into contact with the fixed contacts 79 and simultaneously energize the main heaters 38 and the auxiliary heaters 48 and 49.

Heat from the main heaters 38 will perform the toasting function and heat from the auxiliary heaters 48 and 49 will be radiated and also reflected to the bimetallic timer 74 so as to cause its central portion to move downwardly slowly. The member 104 will also move downwardly with the central portion of the bimetallic element 74 as it comes in contact with the inturned portions 105' of the member 104. This will slowly pivot the latch release lever 97 counter-clockwise.

Heat from both of the auxiliary heaters 48 and 49 will heat the bimetallic element 74 fairly rapidly during the first part of the toasting interval. Toward the end of the first toasting interval heat from the main heaters 38 will raise the temperature of the toaster as a whole quite considerably. This heat will be transmitted to the casing 51 of the switch 50. This will cause the bimetallic element 55 to flex downwardly and cause the abutment 56 to move away from the spring contact 53 and permit it to move away from the contact 52 so as to open the circuit to the low heating capacity auxiliary heater 49.

Heat will continue to be transmitted to the bimetallic timer 74 from the high heating capacity auxiliary heater 48 but at a slower rate until the bimetallic element 74 reaches its dead-center position at which time it will be snapped to its lower over-center position by the action of the spring 80. The snapping of the central portion of the bimetallic element 74 to downward position will carry the member 104 with it and quickly move the latch release lever 97 to its extreme counter-clockwise position so that the lug 96 will strike the lug 95 on the end of the latch lever 84 and move it counter-clockwise so as to move the hook 92 from above the lug 94 and permit the bread carriers 24 to be returned to receiving position under the bias of springs 35. The latch 84 will immediately return to its original position under the action of the spring 88 because the bimetallic element 74 will recover sufficiently to disengage the lugs 95 and 96.

Movement of the carriers to receiving position will also carry the heaters 48 and 49 upwardly away from the bimetallic element 74 to permit it to cool more quickly.

If now the operator desires immediately to institute a second toasting operation, bread is inserted and the manipulating handle 34 moved downwardly as before. The lug 94 of carriage plate 21 will be engaged under the hook 92 of latch lever 84 as before. However, as will presently appear, the auxiliary plate 41 will be prevented from moving to its lowermost position so that the bridging contact 78 will not be brought into engagement with the fixed contacts 79 to energize the toaster until the bimetallic element 74 has cooled and moved back to its upward over-center position.

When the auxiliary plate 41 moved upwardly the lug 120 was removed from engagement with the lug 118 of link 115 whereby the link 115 was moved counter-clockwise by the spring 16. The bimetallic element 74 being in its downward over-center position at this time the link 106 will also be moved downwardly since it is carried by the latch release lever 97. Counter-clockwise movement of the link 115 will cause the lug 117 to ride over the pointed end of the link 106 until it is behind the hook 113 whereby the spring 112 will move the link 106 clockwise to engage the hook 113 over the lug 117 of link 115.

When the handle 34 is moved downwardly again the lug 120 on the auxiliary plate 41 will engage the lug 118 of the link 115. Since the link 115 is held in its counter-clockwise position by the hook 113 the movement of the auxiliary plate 41 downwardly will be arrested and the spring 42 elongated. This will prevent the lug 76 from closing contacts 78 and 79 as previously described.

The bimetallic element 74 will cool within a few seconds and snap upwardly again to its upper over-center position. The central portion of the bimetal 74 will carry the member 104, latch release lever 97 and link 106 upwardly with it so that the hook 113 will be removed from in front of the lug 117 and permit the spring 42 to move the auxiliary plate 41 downwardly by rotating the link 115 clockwise. The lug 76 will engage the spring 77 and bring the bridging contact 78 against the fixed contacts 79 and reenergize the entire toaster without any attention from the operator.

Heat will be transmitted from the heaters 48 and 49 to the bimetallic timer 74 as before. However, since the toaster as a whole is hotter than for the first toasting interval the switch 50 will also be hotter so that the contacts 52 and 53 will be separated to deenergize the heater 49 earlier in the cycle than for the first toasting interval. This will prolong the toasting interval over that which would otherwise take place. By a proper design this prolongation will be just sufficient to compensate for the tendency of the bimetallic timer 74 to over-compensate. Eventually the bimetallic timer 74 will again snap downwardly to time the second toasting operation in the same manner as described in connection with the first toasting interval.

The operator may continue to toast bread in rapid succession without waiting for the bimetallic element 74 to cool and as is apparent need not even know that it has not cooled. This arrangement assures that the bimetallic timer 74 will always be in its proper cool condition before the heaters are energized so that each toasting interval will be properly timed regardless of how the toaster is used.

The use of the multiple heaters with means for cutting one out of operation as the toaster heats up assures that the toast will be done to the same degree regardless of the time interval between toasting operations and of the number of times the toaster is operated in rapid succession.

If at any time the operator should desire to examine the toast during a toasting operation or to stop the operation of the toaster during the toasting operation it is only necessary to rotate the knob 124 to cause the cam 122 to rotate the latch lever 84 counter-clockwise to release the bread carriers for movement to receiving or inspecting position. The manipulating handle 34 may immediately be pushed downwardly again without materially affecting the operation of the toaster.

If the operator desires to prepare light toast the knob 62 is rotated so that a high point of the cam 60 will engage the projection 59 and raise the spring arm 58 upwardly so as to flex the bimetallic element 55 upwardly and apply more pressure to the spring contact 53. Under these conditions the bimetallic element 55 will have to be heated up more before the contacts 52 and 53 are separated so that the heater 49 will remain on longer during each toasting interval. This will cause the bimetallic timing element 74 to move to its lower over-center position sooner than before and thus shorten the toasting interval to produce light toast.

If medium or dark toast is desired the knob 62 is rotated so that a lower point on the cam 60 engages the projection 59 so as to lessen the pressure on the spring contact 53. This will cut the heater 49 out of circuit sooner so that it will take a longer time for the bimetallic element 74 to terminate the toasting interval. This adjustment will produce medium or dark toast depending upon the setting of the cam 60.

From the foregoing it can be seen that this invention provides manually adjustable means for varying the heat applied to the thermal timer during a toasting interval in adjusting the timer for producing light, medium, or dark toast upon which is interposed thermally responsive means for also varying the heat applied to the thermal timer so as to compensate the thermal timer to produce the same color of toast regardless of the residual heat in the toaster as a whole.

While I have shown but a single embodiment of my invention it is to be understood that this embodiment is to be taken as illustrative only and not in a limiting sense. I do not wish to be limited to the particular structure shown and described but to include all equivalent variations thereof except as limited by the scope of the claims.

I claim:

1. A toaster comprising, bread carriers movable from receiving to toasting position, a thermal timer for timing the duration of successive toasting intervals, said timer being movable from a cold position to a hot position upon being heated and back to its cold position upon being cooled, a plurality of heaters for said thermal timer, means for moving said carriers to toasting position, means for latching said carriers in toasting position, means actuated by movement of said carriers to toasting position for energizing said heaters, compensating thermal means for cutting one of said heaters out of circuit responsive to rises in toaster temperature and means actuated by movement of said timer to its hot position for releasing said latching means.

2. A toaster according to claim 1 including manually actuatable means for releasing said latching means independently of said timer.

WARREN A. HUMPHREY.

(References on following page)

REFERENCES CITED

The following references are of record in the file of this patent:

UNITED STATES PATENTS

| Number | Name | Date |
|---|---|---|
| 2,198,133 | Smith | Apr. 23, 1940 |
| 2,209,768 | Dillman | July 30, 1940 |
| 2,302,117 | Gomersall | Nov. 17, 1942 |
| 2,302,315 | Hall | Nov. 17, 1942 |
| 2,325,551 | Seharf | July 27, 1943 |
| 2,363,169 | Fischer | Nov. 21, 1944 |
| 2,414,396 | Sardeson | Jan. 14, 1947 |
| 2,508,464 | McCullough | May 23, 1950 |
| 2,558,199 | Scharf | June 26, 1951 |
| 2,558,438 | Humphrey | June 26, 1951 |